United States Patent
Wick et al.

(10) Patent No.: US 7,592,388 B2
(45) Date of Patent: Sep. 22, 2009

(54) LONG FIBER-REINFORCED THERMOPLASTIC COMPOSITIONS, ARTICLES MADE THEREFROM AND METHODS OF MAKING THE SAME

(75) Inventors: Robert J. Wick, Rushford, MN (US); Karl M. Hoppe, Lewiston, MN (US); Greg S. Cagle, Fountain City, WI (US)

(73) Assignee: RTP Company, Winona, MN (US)

( * ) Notice: Subject to any disclaimer, the term of this patent is extended or adjusted under 35 U.S.C. 154(b) by 236 days.

(21) Appl. No.: 11/368,044

(22) Filed: Mar. 3, 2006

(65) Prior Publication Data

US 2006/0275594 A1   Dec. 7, 2006

(51) Int. Cl.
*D04H 13/00*   (2006.01)
*B32B 27/04*   (2006.01)
*B32B 17/02*   (2006.01)
*C08K 3/34*    (2006.01)
*B60C 1/00*    (2006.01)

(52) U.S. Cl. ............... 524/494; 428/299.1; 428/299.4; 428/292.1; 524/493; 524/492; 523/348; 523/351

(58) Field of Classification Search ............. 428/292.1, 428/299.1, 299.4; 524/494, 492, 493
See application file for complete search history.

(56) References Cited

U.S. PATENT DOCUMENTS

| 4,312,917 A | 1/1982 | Hawley |
| 4,439,387 A | 3/1984 | Hawley |
| 5,514,745 A | 5/1996 | Yoshino |
| 5,986,009 A * | 11/1999 | Thoen et al. ................. 525/232 |
| 6,521,693 B2 * | 2/2003 | Saito et al. .................. 524/494 |

* cited by examiner

*Primary Examiner*—D. Lawrence Tarazano
*Assistant Examiner*—Camie S Thompson
(74) *Attorney, Agent, or Firm*—McDermott Will & Emery

(57) ABSTRACT

The present invention relates to a high melt flow thermoplastic resin filled with long fibers, such as long glass fibers, stainless steel fibers, carbon fibers, aramid fibers, or other like fibers, and having high melt flow properties. The high melt flow properties of the thermoplastic resin contribute to its ease of production, allowing for the production of long fiber-reinforced thermoplastic compositions having good dispersion and wet-out in the pellet and molded article, and characterized by low levels of loose fiber in the pellet and/or compound. Although any concentration of fibers may be present in the fiber-reinforced thermoplastic composition, the high melt flow thermoplastic resins are especially suitable for high concentrate long glass fiber-reinforced thermoplastic compositions.

20 Claims, No Drawings

LONG FIBER-REINFORCED THERMOPLASTIC COMPOSITIONS, ARTICLES MADE THEREFROM AND METHODS OF MAKING THE SAME

TECHNICAL FIELD

The present invention relates to long fiber-reinforced thermoplastic compositions and methods of making the same. Specifically, the present invention relates to long fiber-reinforced thermoplastic compounds, articles made therefrom, and methods of making the same. The present invention is especially suitable for high concentrate long fiber-reinforced thermoplastic compositions.

BACKGROUND

It is generally known to compound thermoplastic resins with fillers, such as glass, particles, fibers and other like materials. In addition, it is known to pelletize said filled thermoplastic resins to form filled pellets for storage and/or transport of said filled thermoplastic resins. Typically, a thermoplastic resin is heated to form a melt, whereby the filler, such as the glass, particles, fibers and other like materials are added to the melt to form a melted filled thermoplastic resin. The resin is then typically extruded to form articles, or extruded for pelletizing.

More specifically, it is further known to compound thermoplastic resins with fiber rovings for the production of long fiber-reinforced thermoplastic resins. When the fiber roving is a glass fiber roving, the typical fiber loadings in such compounds vary from about 30% to about 60% glass fiber by weight, although certain products exist in concentrate form with fiber loadings up to about 75% by weight glass fiber. However, such concentrates are typically characterized by excessive loose fiber, poor dispersion in molded articles, and generally poor pellet integrity.

For example, U.S. Pat. Nos. 4,312,917 and 4,439,387 to Hawley relate to compound composite structure that is a combination of plastic and other materials, including glass fiber, for forming a structure usable in the fabrication of manufactured products or components. The compound composite structure is composed of a thermoplastic resin material bonded to, by mixture with, a composite reinforcing structure. The composite reinforcing structure consists of fibers imbedded in a thermoplastic resin material, and may be formed by passing molten plastic resin material through a die which imbeds fibers.

In addition, U.S. Pat. No. 5,514,745 to Yoshino disclose a mixture for melt process moldings consisting essentially of about 5 to about 70 weight percent of a master batch prepared in the form of pellets formed by cutting a long glass fiber-reinforced polypropylene resin, and about 30% to about 95% by weight of polypropylene resin. The long glass fiber-reinforced polypropylene resin is prepared in such a manner that a bundle of continuous reinforcement glass fibers surface-finished with a finishing agent containing a coupling agent is impregnated with a modified polypropylene resin having a functional group capable of chemically bonding with the coupling agent and having a melt flow rate of about 70 to about 300 g/10 min (ASTM D-1238, load: 2.16 kg, temperature: 230° C.) while the bundle of glass fibers is being drawn. The pellets have a length of about 2 to about 50 mm in the direction along the fibers. The glass fibers in the pellets extend uniformly in parallel with each other through a distance substantially equal to the length of the pellets. The pellets have a glass fiber content of about 60 to about 90 weight percent.

SUMMARY

The present invention relates to a thermoplastic resin filled with long fiber and having high melt flow characteristics. The high melt flow characteristics of the thermoplastic resin contribute to its ease of production, allowing for the production of long fiber-reinforced thermoplastic compositions having good wet-out, good dispersion in both the pellet and the molded article, and characterized by low levels of loose fiber.

To this end, in an embodiment of the present invention, a thermoplastic resin blend is provided comprising: a thermoplastic resin selected from the group consisting of polypropylene, low density polyethylene, ethylene vinyl acetate copolymer, ethylene acrylic acid copolymer, and blends thereof having a melt flow above about 300 g/10 min as measured by ASTM D-1238-95 under preferred conditions (as defined below); and long fibers blended into the thermoplastic resin, wherein the long fibers are present in a concentration of between about 8 percent and about 75 percent by volume.

In an alternate embodiment of the present invention, a method of making a long fiber-reinforced thermoplastic resin blend is provided comprising the steps of: pulling a long fiber roving into an extruder, and adding a thermoplastic resin selected from the group consisting of polypropylene, low density polyethylene, ethylene vinyl acetate copolymer, ethylene acrylic acid copolymer and blends thereof, having a melt flow of above about 300 g/10 min, as measured by ASTM D-1238-95 under preferred conditions (as defined below), to the long fiber roving to form a blend of long fibers and thermoplastic resin, wherein the concentration of long fibers is between about 8 percent and about 75 percent by volume.

In a still further alternate embodiment of the present invention, a method of making a long fiber-reinforced thermoplastic resin blend is provided comprising the steps of: melting a thermoplastic resin selected from the group consisting of polypropylene, low density polyethylene, ethylene vinyl acetate copolymer, ethylene acrylic acid copolymer and blends thereof, having a melt flow above about 300 g/10 min, as measured by ASTM D-1238-95 under preferred conditions (as defined below), and blending an amount of long fiber rovings into the thermoplastic resin to form a blend of long fibers and the thermoplastic resin, wherein the blend of long fibers and thermoplastic resin has a concentration of long fibers of between about 8 percent and about 75 percent by volume.

DETAILED DESCRIPTION OF THE PRESENTLY PREFERRED EMBODIMENTS

In a first embodiment of the present invention, a thermoplastic resin blend is provided, comprising a thermoplastic resin filled with fibers and/or fiber rovings. Specifically, the fibers are present in a concentration of between about 8 percent and about 75 percent by volume. Preferably, the fibers are present in a concentration of between about 35 percent by weight and about 65 percent by volume. Most preferably, the fibers are long glass fibers, and are present in a concentration of about 45 percent by volume.

Fiber rovings useful for the present invention include, but are not limited to, long glass fiber rovings, stainless steel fiber rovings, carbon fiber rovings, aramid fiber rovings, and other like fiber rovings. Preferably, the fiber rovings of the present invention comprise long glass fiber rovings.

The long glass fibers used herein are fibers of E-glass, S-glass, C-glass, AR-glass, T-glass, D-glass, R-glass, or other like materials. Ordinarily, fibers of such glass are provided in a twisted bundle of a plurality of glass filaments. The glass fibers may be surface-coated with a sizing agent to aid in the dispersion of the glass fibers in the thermoplastic resin.

The present invention allows a relatively high concentration of fibers to be blended, mixed, extruded, or otherwise incorporated into a high melt flow thermoplastic resin. Different fibers useful for the present invention have different densities. Therefore, each of the materials will be expressed in terms of volume percent as opposed to weight percent. For example, 70 percent by weight long glass fibers corresponds to about 45 percent by volume.

Glass fiber rovings, as described above, are commonly available in a number of different yields including 113 yds/lb, 206 yds/lb, 225 yds/lb, 450 yds/lb and 675 yds/lb. The preferred long glass fibers used in the present invention include those having a yield of about 225 yds/lb or about 206 yds/lb. Moreover, preferred long glass fibers have a filament diameter of about 17 microns, although other diameter long glass fibers are contemplated by the present invention, and the invention should not be limited as herein disclosed.

The thermoplastic resin may be polypropylene, polyethylene, ethylene copolymers, polyamide, polycarbonate, PEEK, acrylonitrile-butadiene-styrene copolymer, acetal, polyphenylene sulfide, copolymers, or blends of these resins. The thermoplastic resin may be modified, such as, but not limited to, maleic anhydride-modified, or unmodified. For example, the thermoplastic resin may be maleic anhydride-modified polypropylene. In the context of the preferred fibers of the present invention, the preferred thermoplastic resin is maleic anhydride modified or unmodified polypropylene. Other preferred thermoplastic materials useful for the present invention include, but are not limited to, low density polyethylene, ethylene vinyl acetate copolymer, ethylene acrylic acid copolymer, polyphenylene sulfide, and/or blends of these materials.

The thermoplastic resin has a high melt flow, as measured by ASTM D-1238-95. Specifically, the thermoplastic resin has a high melt flow to improve dispersion of long fiber in the thermoplastic resin, improve wet-out, improve blending qualities and moldability, pellet production and pellet integrity. Preferably, the thermoplastic resin comprises polypropylene. More preferably, the polypropylene is maleic anhydride modified polypropylene. Specifically, the melt flow of the thermoplastic resin is preferably above about 300 g/10 min, as measured by ASTM D-1238-95. It should be noted that different preferred materials are tested under different conditions pursuant to ASTM D-1238-95, as shown in the following table:

TABLE 1

Preferred conditions for measuring melt flows of various preferred thermoplastic resins pursuant to ASTM D-1238-95.

| Resin | Temperature | Weight |
| --- | --- | --- |
| Low density polyethylene | 125° C. | 0.325 kg |
| Ethylene vinyl acetate | 125° C. | 0.325 kg |
| Ethylene acrylic acid | 190° C. | 2.16 kg |
| Polypropylene | 230° C. | 2.16 kg |

Table 1 illustrates preferred conditions for measuring melt flow of preferred thermoplastic resins pursuant to ASTM D-1238-95. As noted above, the preferable melt flow for the instant invention is above about 300 g/10 min, as measured by ASTM D-1238-95 under the preferred conditions specified in Table 1 for each preferred thermoplastic resin.

For example, a thermoplastic resin blend having 45 percent by volume (70 percent by weight) long glass fiber where the thermoplastic resin blend is comprised of polypropylene or maleic anhydride modified polypropylene having a melt flow of about 300 g/10 min (at preferred conditions of 2.16 kg; 230° C.) or higher significantly improves throughput, processability, pellet quality, and dispersion in a molded article.

Thermoplastic resins having a melt flow index of at least up to about 1100 g/10 min or greater, as measured by ASTM D-1238-95 under conditions specified in Table 1, can be used without having a negative effect on the mechanical properties of the composites made with such blends, and provides even better processing, pellet quality and molded articles.

The long fiber-reinforced thermoplastic resin blend may form an article. Alternatively, the long fiber-reinforced thermoplastic resin blend may be pelletized to form pellets for storage and/or transport. The pellets may be melted and formed into articles by extrusion, injection molding, compression molding and other like processes known to those skilled in the art.

In a second embodiment of the present invention, a fiber roving is pulled into an extruder. A high melt flow thermoplastic resin (preferably above about 300 g/10 min pursuant to ASTM D-1238-95 under the preferred conditions specified in Table 1) is added to the fiber to produce a long fiber-reinforced thermoplastic composition. The long fiber-reinforced thermoplastic composition can be cooled and chopped to form long fiber-reinforced thermoplastic pellets. Alternatively, the long fiber-reinforced thermoplastic composition may form articles. Preferably, the thermoplastic is polypropylene. More preferably, the polypropylene is modified by maleic anhydride. In addition, the polypropylene preferably has a melt flow of about 1100 g/10 min, as measured by ASTM D-1238-95, under 2.16 kg at 230° C. The composition preferably has a concentration of about 45 percent by volume long glass fibers.

In a third embodiment of the present invention, a thermoplastic resin is melted in an extrusion process, and blended with an amount of chopped long fibers. The chopped long fibers may be added to the melted thermoplastic resin at a concentration of between about 8 percent and about 75 percent by volume. Preferably, when the fiber is a chopped long glass fiber, the long glass fibers are added to the melted thermoplastic resin at a concentration of between about 35 percent and about 65 percent by volume (about 60 percent and about 85 percent by weight). Most preferably, the long glass fibers are added to the melted thermoplastic resin at a concentration of about 45 percent by volume (70 percent by weight). The fibers may be chopped long glass fibers, stainless steel fibers, carbon fibers, aramid fibers, other like fibers and combinations or blends thereof. Preferably, the thermoplastic is polypropylene. More preferably, the polypropylene is modified by maleic anhydride. In addition, the polypropylene preferably has a melt flow of about 1100 g/10 min, as measured by ASTM D-1238-95, under 2.16 kg at 230° C.

EXAMPLE

Polypropylene resin, having a melt flow rate of 1100 g/10 min, is loaded with about 45% by volume long glass fiber (70 percent by weight). Most preferred glass fibers are those that have a yield of about 225 yds/lb or about 206 yds/lb, and generally have a filament diameter of 17 microns. Moreover, the polypropylene is preferably grafted with maleic anhydride. Other additives include heat stabilizers and antioxidants.

The present invention has been described above with reference to exemplary embodiments. However, those skilled in the art having read this disclosure will recognize that changes and modifications may be made to the exemplary embodiments without departing from the scope of the present invention.

We claim:

1. A thermoplastic resin blend comprising:
    a thermoplastic resin selected from the group consisting of polypropylene, low density polyethylene, ethylene vinyl acetate copolymer, ethylene acrylic acid copolymer, and blends thereof, having a melt flow above about 400 g/10 min as measured by ASTM D-1238-95, wherein the melt flow of polypropylene is measured at 230° C. and with a weight of 2.16 kg, the melt flow of low density polyethylene is measured at 190° C. and with a weight of 2.16 kg, the melt flow of ethylene vinyl acetate copolymer is measured at 125° C. and with a weight of 0.325 kg, and the melt flow of ethylene acrylic acid copolymer is measured at 125° C. with a weight of 0.325 kg; and
    long fibers blended into the thermoplastic resin,
    wherein the long fibers are present in a concentration of between about 8 percent and about 75 percent by volume.

2. The thermoplastic resin blend of claim 1 wherein the long fibers are selected from the group consisting of long glass fibers, stainless steel fibers, carbon fibers, aramid fibers, and mixtures thereof.

3. The thermoplastic resin blend of claim 1 wherein the long fibers are present in a concentration of between about 35 percent and about 65 percent by volume.

4. The thermoplastic resin blend of claim 1 wherein the long fibers are present in an amount of about 45 percent by volume.

5. The thermoplastic resin blend of claim 1 wherein the thermoplastic resin comprises polypropylene.

6. The thermoplastic resin blend of claim 1 wherein the thermoplastic resin is maleic anhydride modified polypropylene.

7. The thermoplastic resin blend of claim 1 wherein the thermoplastic resin has a melt flow of about 1100 g/10 min, as measured by ASTM D-1238-95.

8. A product made from the thermoplastic resin blend of claim 1 wherein said product is selected from the group consisting of an article and pellets.

9. A method of making a long fiber-reinforced thermoplastic resin blend comprising the steps of:
    pulling a long fiber roving into an extruder, and
    adding a thermoplastic resin to the long fiber roving to form a blend of long fibers and thermoplastic resin, wherein the thermoplastic resin is selected from the group consisting of polypropylene, low density polyethylene, ethylene vinyl acetate copolymer, ethylene acrylic acid copolymer and blends thereof, having a melt flow of above about 400 g/10 min, as measured by ASTM D-1238-95, wherein the melt flow of polypropylene is measured at 230° C. and with a weight of 2.16 kg, the melt flow of low density polyethylene is measured at 190° C. and with a weight of 2.16 kg, the melt flow of ethylene vinyl acetate copolymer is measured at 125° C. and with a weight of 0.325 kg, and the melt flow of ethylene acrylic acid copolymer is measured at 125° C. with a weight of 0.325 kg,
    wherein the concentration of long fibers is between about 8 percent and about 75 percent by volume.

10. The method of claim 9 wherein the long fibers are selected from the group consisting of glass fibers, stainless steel fibers, carbon fibers, aramid fibers, and mixtures thereof.

11. The method of claim 9 wherein the concentration of long fibers is between about 35 percent and 65 percent by volume.

12. The method of claim 9 wherein the concentration of long fibers is about 45 percent by volume.

13. The method of claim 9 wherein the thermoplastic resin is selected from the group consisting of polypropylene, maleic anhydride modified polypropylene, or blends thereof.

14. The method of claim 9 wherein the thermoplastic resin has a melt flow rate of about 1100 g/10 min, as measured by ASTM D-1238-95.

15. A method of making a long fiber-reinforced thermoplastic resin blend comprising the steps of:
    melting a thermoplastic resin selected from the group consisting of polypropylene, low density polyethylene, ethylene vinyl acetate copolymer, ethylene acrylic acid copolymer and blends thereof, having a melt flow of above about 400 g/10 min, as measured by ASTM D-1238-95, wherein the melt flow of polypropylene is measured at 230° C. and with a weight of 2.16 kg, the melt flow of low density polyethylene is measured at 190° C. and with a weight of 2.16 kg, the melt flow of ethylene vinyl acetate copolymer is measured at 125° C. and with a weight of 0.325 kg, and the melt flow of ethylene acrylic acid copolymer is measured at 125° C. with a weight of 0.325 kg, and
    blending an amount of long fiber rovings into the thermoplastic resin to form a blend of long fibers and the thermoplastic resin,
    wherein the blend of long fibers and thermoplastic resin has a concentration of long fibers of between about 8 percent and about 75 percent by volume.

16. The method of claim 15 wherein the long fibers are selected from the group consisting of long glass fibers, stainless steel fibers, carbon fibers, aramid fibers and mixtures thereof.

17. The method of claim 15 wherein the concentration of long fibers is between about 35 percent and 65 percent by volume.

18. The method of claim 15 wherein the concentration of long fibers is about 45 percent by volume.

19. The method of claim 15 wherein the thermoplastic resin is selected from the group consisting of polypropylene, maleic anhydride modified polypropylene, or blends thereof.

20. The method of claim 15 wherein the thermoplastic resin has a melt flow rate of about 1100 g/10 min, as measured by ASTM D-1238-95.

* * * * *